McGeorge & Greer.
Corn Harvester.
No. 24,477. Patented June 21, 1859.
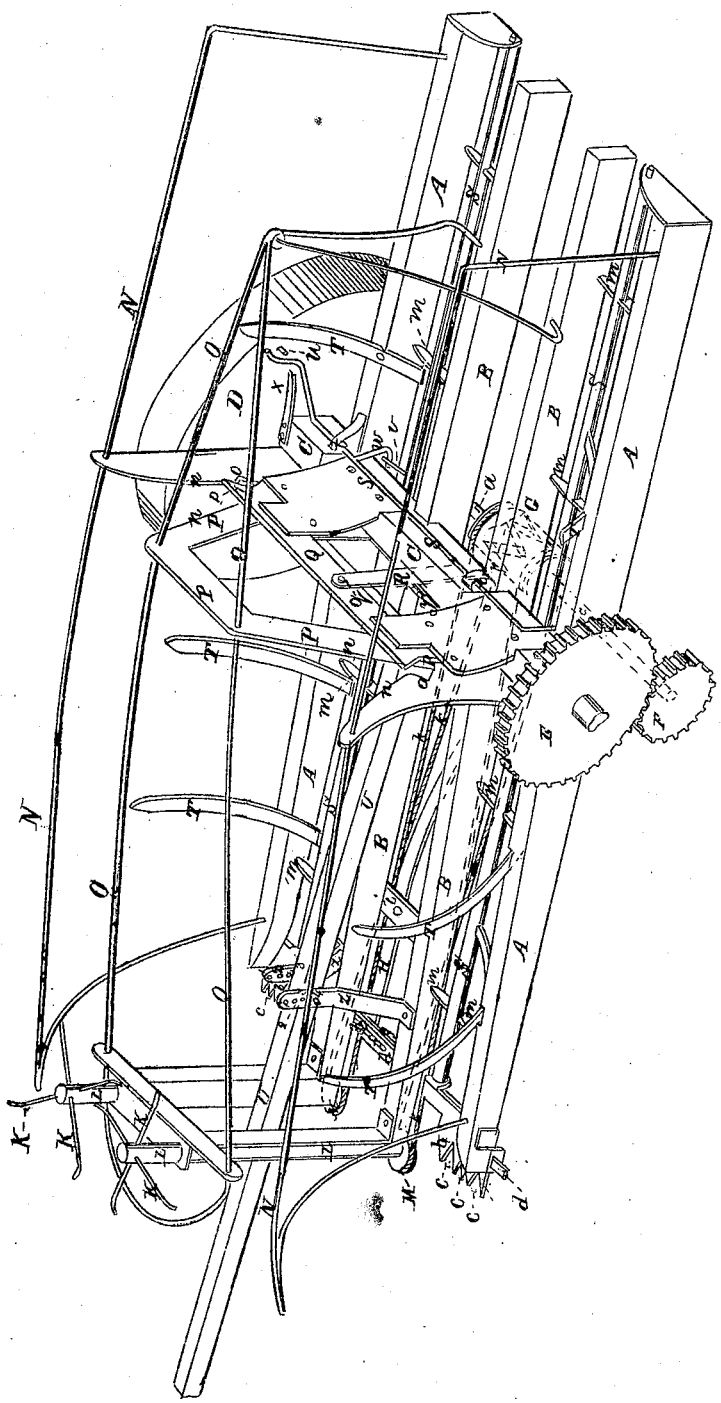
Witnesses
Thos. P. Reary
N. _____
H. D. McGeorge
J. Greer

UNITED STATES PATENT OFFICE.

H. D. McGEORGE AND D. S. GREER, OF MORGANTOWN, VIRGINIA.

IMPROVEMENT IN CORN AND CANE HARVESTERS.

Specification forming part of Letters Patent No. 24,477, dated June 21, 1859.

*To all whom it may concern:*

Be it known that we, H. D. McGEORGE and D. S. GREER, of Morgantown, in the county of Monongalia and State of Virginia, have invented certain new and useful Improvements in Corn and Cane Harvesters; and we do hereby declare that the following is a full, clear, and exact description of the same, reference being had to the accompanying drawing, which represents a perspective view of said cane-harvester.

The nature of our invention relates to the application of vertical knives to the delivering apparatus of corn or cane harvesters for the purpose of cutting the cane into two or more pieces before it is dropped to the ground.

To enable others skilled in the art to make and use our invention, we will proceed to describe its construction and operation.

A and B represent four longitudinal timbers, which are bolted or otherwise secured to the cross-piece C, thus constituting the frame of the machine.

D represents the driving-wheels, one of which only is represented in the drawing.

E represents a cogged wheel, which is secured to one of the driving-wheels, and which meshes into the pinion F on shaft $a$, to which shaft the cam-wheel G is also secured.

$b$ represents the stationary knives of the cutting apparatus for cutting the cane. They are secured to the outer beams, A.

$c$ represents the vibrating knives, working under and against the knives $b$. The two bars $d$ and $g$ of the knives $c$ are coupled together by means of a bolt, $h$, which passes through the slots $f$ of the cutter-bars $d$ and $g$.

The frames A, to which the stationary cutters $b$ are secured, can be so adjusted on the cross-piece C, to which it is bolted, that their front ends may be contracted or distended to adjust them to different widths of rows, and the movable cutters can be adjusted accordingly by the arrangement of the bolt $h$, which passes through the slots $f$.

H is a lever, which is pivoted at $i$ to the frame of the machine, and one arm of which is secured to the bolt $h$, while the end of the other arm reaches into the zigzag grooves of the cam-wheel G, which thus operates the cutting apparatus.

K represents two horizontal reels, the shafts L of which are vertical, and which receive a rotary motion by means of the belts $k$, which are operated through the cam-wheel G, and which pass around the pulleys M. The arms of the reels, as they rotate, bend the cane toward the cutting apparatus and cause it to pass between the guide-rods N and O.

P is a vertical metal frame, which is secured to the cross-piece C. It is formed on each side with inclines $n$, onto which the cut cane falls, and which terminate in the converging cutters $o$.

Q is a vibrating cutter-bar, the knives $p$ of which operate upon the stationary knives to cut the fallen cane into two or more pieces. The vibrating knife Q is operated from the cam-wheel G by means of the lever R, which has its fulcrum on one side of the cross-piece C, and which is pivoted at $q$ to the cutter-bar Q, while the end $r$ of said lever plays in the cam-groove of the cam-wheel G.

S represents the shafts of two horizontal cradles, which are provided with arms $m$, onto which the cut cane falls, and by which it is discharged from the machine.

T represents inclined guide-pieces, which guide the falling cane onto the cradles S. The lower ends of the guide-pieces T reach down to the shafts S, and thus cause all the fallen cane to accumulate on one side of said shafts, or on those arms which are pointed toward the frames B.

$s$ is a horizontal rod, which can turn in its bearings $t$. The curved end of this rod is operated at each revolution of the driving-wheel D by a pin, $u$, which causes said rod to turn on its bearings, and thereby to trip the pin $v$ of the shaft S, which, while the cane is accumulating on the horizontal cradles, was supported by the bent arm $w$, and the cane is thus discharged, while the rod $s$ is carried back to its original position by the action of spring $x$ upon its curved end.

U represents the tongue of the machine, to which the team is hitched. It is hinged at $y$ to the cross-piece C, and it is fastened between the braces Z, where its position can be adjusted by means of the adjusting-holes 1 2 3, &c., which thus afford the means to regulate the height of the machine.

The operation of this machine is as follows: As the machine is moved over the field the driving-wheels D cause the shaft $a$ to revolve by the action of the pinions E and F, and consequently the reels K, horizontal knives c b, and vertical knives o p are operated. The cane is carried by the reels K in between the guide-rods N O, and is cut off by the cutters c b, and the stalks fall onto the inclines n and between the cutters o p, by which they are cut in two. They then drop down onto the reels S, and are caused to accumulate on the arms of said reels, but only on one side of the shafts S, by the action of the guide-pieces T. As soon as the pin u on wheel D turns the shaft S the pin v is tripped, and the weight of the stalks, being on one side of the shafts S, turn said shafts and the cut stalks drop to the ground.

If it is desired to cut the stalks in more than two pieces, a number of vertical cutters has to be used accordingly.

Having thus fully described the nature of our invention, what we claim therein as new, and desire to secure by Letters Patent, is—

Providing a corn or cane harvester with a vertical reciprocating cutting apparatus for the purpose of cutting the stalks into two or more pieces, substantially in the manner herein described.

H. D. McGEORGE.
D. S. GREER.

Witnesses:
T. P. REAY,
G. NIMAN.